United States Patent
Sommer et al.

(10) Patent No.: US 8,565,552 B2
(45) Date of Patent: Oct. 22, 2013

(54) ASSEMBLING MULTIPLE MEDICAL IMAGES INTO A SINGLE FILM IMAGE

(75) Inventors: Erica Anastasia Sommer, Middleburg Heights, OH (US); Jeremy Franklin Audino, Solon, OH (US); Christopher Michael Harley, Middleburg Heights, OH (US)

(73) Assignee: Codonics, Inc., Middleburg Heights, OH (US)

(*) Notice: Subject to any disclaimer, the term of this patent is extended or adjusted under 35 U.S.C. 154(b) by 854 days.

(21) Appl. No.: 11/985,210

(22) Filed: Nov. 14, 2007

(65) Prior Publication Data

US 2008/0118141 A1     May 22, 2008

Related U.S. Application Data

(60) Provisional application No. 60/858,888, filed on Nov. 14, 2006.

(51) Int. Cl.
   *G06K 9/36*     (2006.01)
   *G06K 9/00*     (2006.01)
   *G03B 27/04*     (2006.01)
   *G09G 5/00*     (2006.01)
   *H04N 1/46*     (2006.01)
   *H04N 1/387*     (2006.01)

(52) U.S. Cl.
    USPC ........... 382/284; 382/132; 355/123; 345/629; 358/540; 358/450

(58) Field of Classification Search
None
See application file for complete search history.

(56) References Cited

U.S. PATENT DOCUMENTS

| | | | | |
|---|---|---|---|---|
| 4,868,733 A * | 9/1989 | Fujisawa et al. | ...... | 1/1 |
| 4,951,233 A * | 8/1990 | Fujiwara et al. | ...... | 715/209 |
| 5,123,056 A * | 6/1992 | Wilson | ...... | 382/132 |
| 5,124,798 A * | 6/1992 | Tanabe et al. | ...... | 358/296 |
| 5,384,912 A * | 1/1995 | Ogrinc et al. | ...... | 345/501 |
| 5,537,946 A * | 7/1996 | Sadeh et al. | ...... | 112/475.03 |
| 5,777,753 A * | 7/1998 | McShane et al. | ...... | 358/302 |
| 6,130,965 A * | 10/2000 | Kobayashi et al. | ...... | 382/284 |
| 6,187,405 B1 * | 2/2001 | Rudin | ...... | 428/43 |
| 6,212,337 B1 * | 4/2001 | Petruchik et al. | ...... | 396/311 |
| 6,526,516 B1 * | 2/2003 | Ishikawa et al. | ...... | 713/340 |
| 6,724,946 B1 * | 4/2004 | Kusama et al. | ...... | 382/284 |
| 6,834,128 B1 * | 12/2004 | Altunbasak et al. | ...... | 382/284 |
| 7,042,504 B1 * | 5/2006 | Toyofuku et al. | ...... | 348/231.1 |
| 7,043,688 B1 * | 5/2006 | Tsutsumi et al. | ...... | 715/255 |
| 7,133,839 B2 * | 11/2006 | Inoue et al. | ...... | 705/27.2 |
| 7,159,173 B2 * | 1/2007 | Trenz | ...... | 715/201 |
| 7,324,137 B2 * | 1/2008 | Akizuki et al. | ...... | 348/221.1 |
| 7,612,908 B2 * | 11/2009 | Asai | ...... | 358/1.2 |

(Continued)

*Primary Examiner* — Michelle Entezari
(74) *Attorney, Agent, or Firm* — Pearne & Gordon LLP

(57) ABSTRACT

A printer receives a plurality of image sections and corresponding image headers from the host as an image concatenation command. The plurality of image sections store the plurality of image sections in a print queue. The printer creates a virtual canvas representing a full image size. The printer determines how many lines of uniform data are present in a top border and a bottom border of the plurality of image sections. A variable formatting module of the printer crops a bottom border of a first image section to create a cropped first image section and a top border of a last image section to create a cropped last image section. The variable formatting module creates a first image frame in the virtual canvas corresponding to the first image section minus the bottom border and a last image frame corresponding to the last image section minus the top border.

15 Claims, 3 Drawing Sheets

(56) References Cited

U.S. PATENT DOCUMENTS

| | | | |
|---|---|---|---|
| 7,653,217 B2* | 1/2010 | Ikegawa | 382/112 |
| 7,873,238 B2* | 1/2011 | Schultz et al. | 382/284 |
| 8,059,201 B2* | 11/2011 | Aarts et al. | 348/564 |
| 8,081,841 B2* | 12/2011 | Schultz et al. | 382/284 |
| 8,315,477 B2* | 11/2012 | Acree | 382/284 |
| 8,452,125 B2* | 5/2013 | Schultz et al. | 382/284 |
| 2002/0069220 A1* | 6/2002 | Tran | 707/503 |
| 2002/0076107 A1* | 6/2002 | Loce et al. | 382/209 |
| 2002/0091740 A1* | 7/2002 | Schantz | 707/530 |
| 2002/0191860 A1* | 12/2002 | Cheatle | 382/282 |
| 2003/0002056 A1* | 1/2003 | Yamaguchi et al. | 358/1.2 |
| 2004/0145593 A1* | 7/2004 | Berkner et al. | 345/619 |
| 2004/0207859 A1* | 10/2004 | Kadoi et al. | 358/1.1 |
| 2005/0140991 A1* | 6/2005 | Ogiwara et al. | 358/1.2 |
| 2006/0221368 A1* | 10/2006 | Higuchi | 358/1.13 |
| 2007/0025723 A1* | 2/2007 | Baudisch et al. | 396/287 |
| 2007/0047020 A1* | 3/2007 | Kim | 358/450 |
| 2007/0065040 A1* | 3/2007 | Ming | 382/284 |
| 2007/0206844 A1* | 9/2007 | Russakoff et al. | 382/132 |
| 2008/0278768 A1* | 11/2008 | Peusens | 358/302 |
| 2010/0158362 A1* | 6/2010 | Lang et al. | 382/165 |

* cited by examiner

ASSEMBLING MULTIPLE MEDICAL IMAGES INTO A SINGLE FILM IMAGE

RELATED APPLICATIONS

This application is a non provisional application of U.S. provisional application Ser. No. 60/858,888, filed Nov. 14, 2006.

BACKGROUND OF THE INVENTION

Printing of lifesize images is essential for orthopedics specialties because doctors in the orthopedics specialty use long film for surgical planning. Computer Radiography/Digital Radiography (CR/DR) systems are taking the place of old-fashioned film/screen systems. Long film has dimensions of 11" by 36" or 11" by 51." CR/DR systems use monitors to view the digital medical images, however, large size monitors (which accommodate 11×36 or 11 by 51 images) are expensive and cannot be put in all locations necessary for the orthopedics specialty doctors. In addition, doctors in the orthopedics specialty like to mark up the film with grease pencils which would not be acceptable on an expensive monitor. Thus, images still need to be printed out on long film.

FujiFILM Medical Imaging systems utilize a LifeSize printing feature to print a life-size medical image of a patient or subject. In a FujiFILM Medical Imaging system, the FujiFILM Medical IIP Workstation is a post-processing workstation where imaging processing takes place. A user interacts with the IIP Workstation to create, QC, manipulate and store images. The images are acquired from, for example, the FUJI CR which creates the images. The FujiFILM Medical Systems IIP Workstation takes the life-sized post-stitched image and breaks the image up into a number of sections, e.g., 2-3 sections, formatted for a specific size of film, e.g., 11"×17" film or a 14"×17" film. Each image section or image plate is printed on the short film (e.g., 11×17 film or 14×17 film) and has border data placed on the top and the bottom of each sheet as well as a predictable alignment mark. The image section or image plate is then manually taped to a wall or a film viewing screen. FIG. 1 illustrates manual placement of three films to create a life-size medical image.

Accordingly, a system is needed to interact with existing Fuji DR Medical Imaging systems and print on long films so that the LifeSize printing feature is completed utilizing a single long film. It would be advantageous for the system and method to utilize an image that was previously stitched so that the advanced features of imaging stitching could be incorporated.

DETAILED DESCRIPTION OF THE INVENTION

The present invention is directed to a system and method for performing image concatenation. Image concatenation virtually re-attaches a stitched image that had previously been broken up into a plurality of smaller images (which may be referred to as image sections or image pieces). This feature can be utilized for Fuji CR imaging systems utilizing the FujiFILM Medical Systems IIP Workstation or for other imaging systems that print a large number of images meant to be reattached, simulating long film. For example, up to nine image sections or image pieces may be image concatenated onto a single long film. In a FUJI imaging system, such as the Fuji CR system and the IIP Workstation, a concatenation print command allows nine images to be printed on a long film.

Under certain operating conditions, a format for the image concatenation command (e.g., AE Title) may be Y IMGCAT *. We note that in order for the Digital Imaging and Communications in Medicine (DICOM) 3.0 standard to be met the actual concatenation command has no spaces, i.e., YIMGCAT*. The addition of a space above is for clarity purposes in order to easily explain the command. In an embodiment of the invention, Y may be any value between 2 and 9 (which represents concatenating between 2 and 9 images on the long film). The asterisk * represents a string of characters and this string of characters identifies a host device that is transmitting or sending the plurality images to be concatenated. Under certain operating conditions, each host has its own unique character identifier. For example, the image concatenation command 3IMGCAT4FLRAD identifies to the printer that 3 images are to be sent from a host system identified as 4FLRAD and the 3 images are to be concatenated. As a reference, Called AE Titles and Calling AE Titles are terms used in DICOM communications. For example, the Called AE Title is printer's name as listed in the CR/DR system, and is how that sending system refers to the Codonics Horizon XL image printer when it's sending images. The Calling AE Title is the name of the CR system. The printer may be configured to be able to receive an image concatenation command, e.g., YIMGCAT*, by inputting a string into a front panel of the printer.

Figure 2:
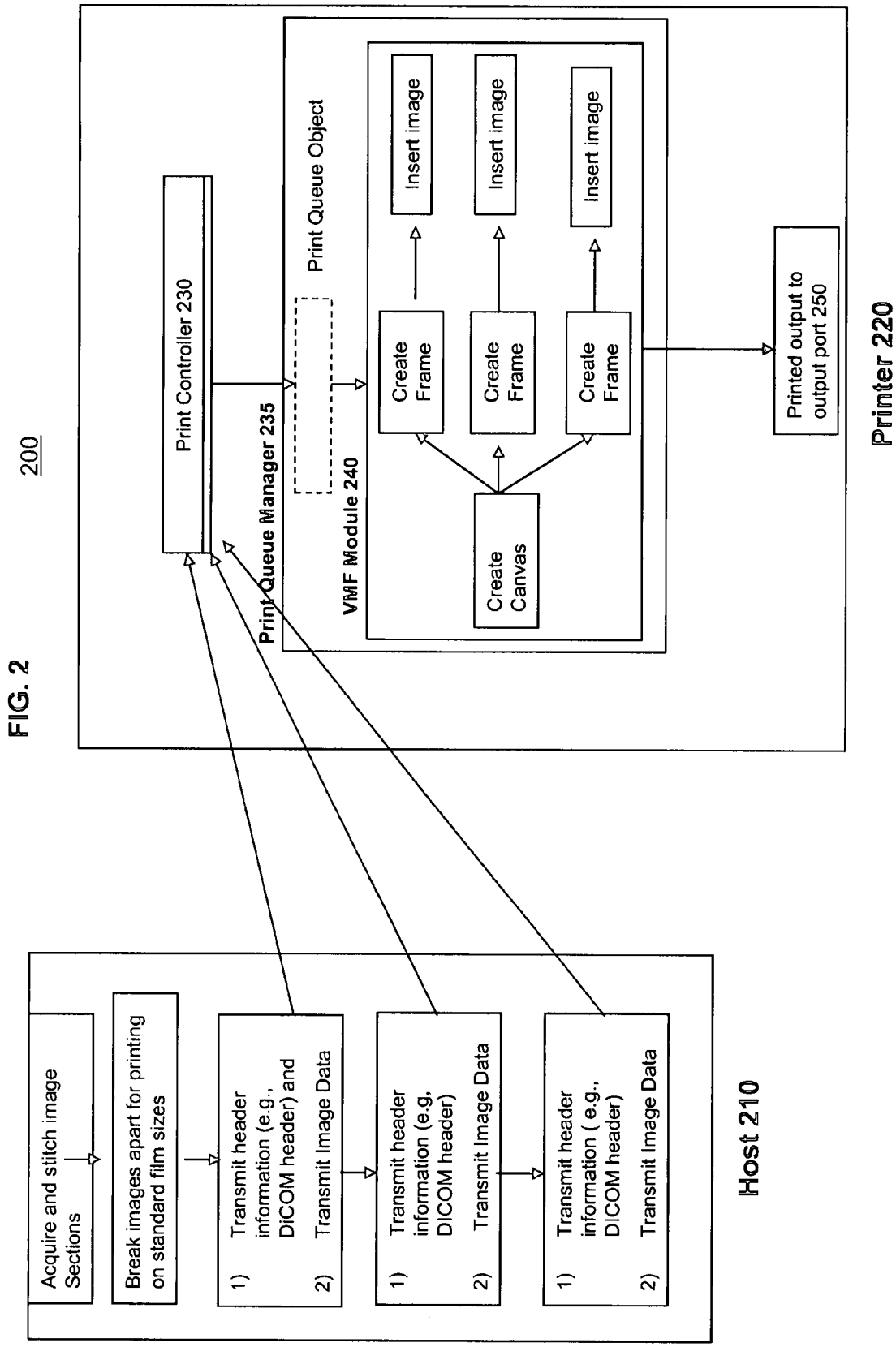
FIG. 2 illustrates a host and a printer utilizing image concatenation according to an embodiment of the invention.

FIG. 2 illustrates a host and a printer utilizing image concatenation according to an embodiment of the invention. The system 200 includes a host 210 and a printer 220. The printer 220 includes a print controller 230 (e.g., the DICOM device), a print queue module 235, and a variable multi-format module 240.

Under certain operating conditions, the host acquires images and stitches the images together to create a stitched image. Stitching may include de-skewing, matching sizes of the image sections or image pieces, or other advanced features. If image concatenation is desired, the stitched image is then divided up into image sections. Alternatively, the stitched image is divided up into image plates or image pieces. The image sections or image pieces are then stored in a queue in the host 210 in the order that the image pieces are to printed. The host 210 then invokes an image concatenation command and specifies the image pieces that are to be printed. The print controller 230 receives the image concatenation request or command from the host 210. After receiving the image concatenation command, the print controller 230 instructs the print queue module 235 to create a print queue object corresponding to the submitted image concatenation command. Although FIG. 2 only illustrates one host, multiple hosts may send concatenation print request to the printer 220 and the print queue module 235 creates a plurality of print queue objects. Each of the plurality of print queue objects corresponds to one of the submitted print jobs. In addition, a single host (e.g., host 210 in FIG. 2) can transmit multiple print jobs and the print queue module 235 creates multiple print queue objects corresponding to the multiple print jobs.

The print controller 230 receives the individual files where each of the files includes header information (e.g., DICOM header information) and image data. The image data represents pieces of the broken up image. Although the image data is sent over as image files, for clarity, the image data is referred to herein as image plates or image sections, because the image plates and/or image sections make up the final concatenated image. The print queue module 235 in the printer 220 stores the header information and image data until all of the image sections are received, e.g., in FIG. 2, when the third image data and header information is received.

The VMF module 240 identifies uniform data, e.g., blank lines, present on the sections of the images (i.e., the image data) transferred to the printer 220 and stored in the print queue module 235. Each image section transmitted to the printer may include uniform data (e.g., blank lines) at a top of the image section and uniform data (e.g., blank lines) at the bottom of an image section. The VMF module 240 in the printer 220 determines a number of lines of uniform data (e.g., blank data or blank lines) that are present at the top of each image section and the number of lines of uniform data (e.g., blank lines of data) that are present at the bottom of each image section. In an embodiment of the invention, the VMF module 240 may only identify uniform data (e.g., blank lines) for a bottom border of the first image section because the top border of the first image piece is not removed. In this embodiment of the invention, the VMF module 240 may also only identify uniform data (e.g., blank lines) for a top border of the last image section because the bottom border of the last image section is not removed.

For FUJI imaging systems, such as the FUJI CR system, the data at the bottom or top of the image section (in the border area) may be colored white and be referred to as white data. On other systems, the data may be represented by a black color and may be referred to as black data. The VMF module 240 effectively crops out blank data in the border areas of each the image sections. Because the plurality of image sections are going to be printed on long film, there are portions of the first image section (i.e., the top border area) and the last image section (i.e., the bottom border area) that do not need to be cropped because the data in these borders will be displayed on the concatenated image that is printed on the long film. For example, with the first image section, the top border is not cropped and the bottom border of blank data is cropped. For image sections between the first image section and the last image section, the top border and the bottom border are both cropped out. For the last image section of the plurality of image sections to be concatenated, the top border is cropped, but the bottom border is not cropped.

The cropping operation of the VMF module 240 may be implemented by scanning each horizontal line at a top of the image section until a line is encountered in the image piece with has data that is not uniform. According, the VMF module 240 can work based on white data, black data, gray data or other colored data, because the VMF module 240 is scanning for non-uniform data. When the VMF module 240 encounters the line with data that is not uniform in the image piece, the VMF module 240 determines that the previous lines of the image piece form a border area, e.g., a top border area. The VMF module 240 repeats the border determining process at the bottom of the image piece. At the bottom of the image piece, the VMF module 240 looks for pixels which are uniform. In other words, the VMF module 240 is looking for data which is all the same or very close to the same value. Once the VMF module 240 finds a predetermined number of lines having uniform data, the cropping module identifies the first of these lines as the beginning of the bottom border area.

Figure 1:
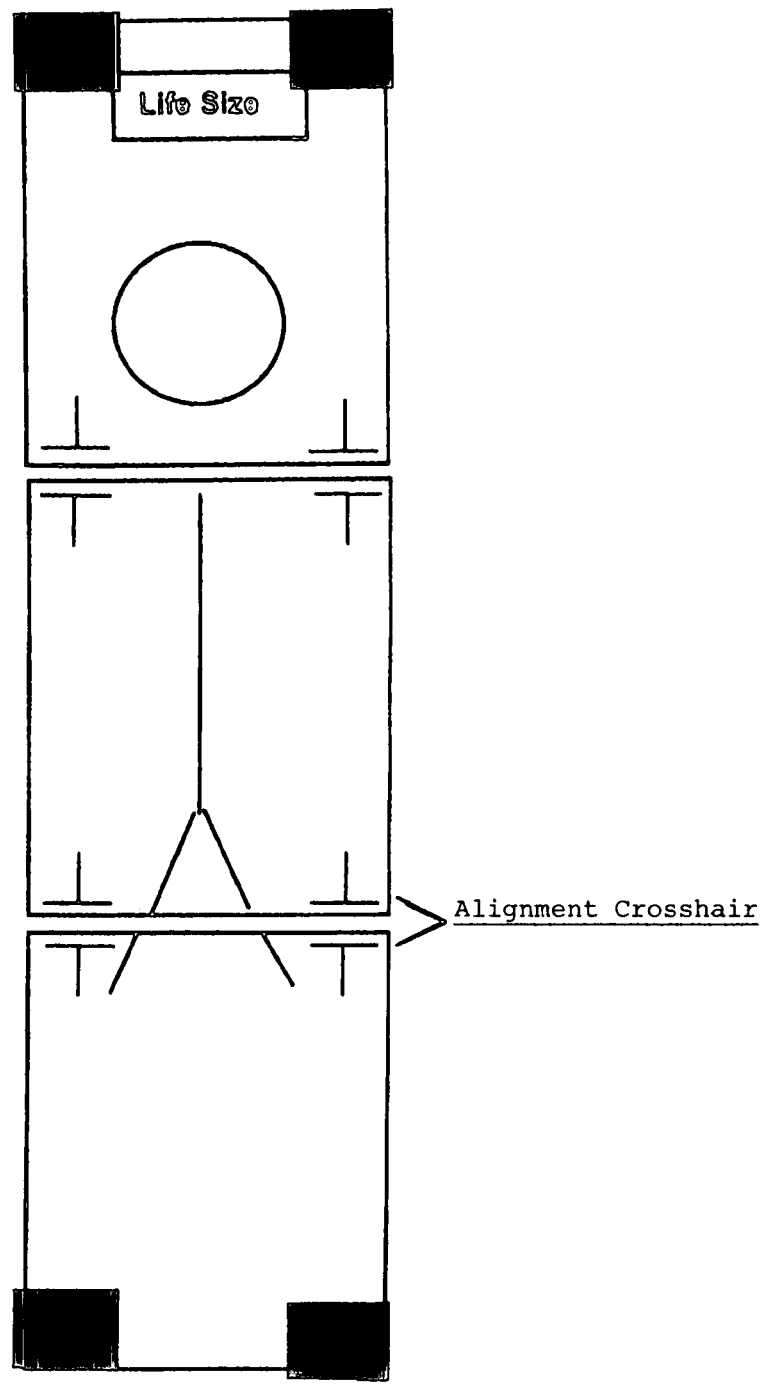
FIG. 1 illustrates manual placement of three films to create a life-size medical image according to an embodiment of the prior art.

Under certain operating conditions, a determination of whether data is uniform is defined to be where less that 10 pixels per horizontal line do not have a uniform value. In other words, 10 non-uniform pixels or less are allowed in a single horizontal line or the VMF module 240 identifies that this line is not in a border region. This allows systems, such as the Fuji CR system to place an alignment cross hair in the image. As illustrated in FIG. 1, the horizontal alignment cross hair takes up more than 10-pixels per line and thus, the VMF module 240 identifies that the alignment cross hair is part of the actual patient or subject data. In other words, the alignment cross hair is the start of the image area. When the images are manually placed together (i.e., the short films are taped together), as in the prior art, the crosshair's function was to guide the scotch tape technician on how to paste the images together.

As noted above, the VMF module 240 in the printer 220 also receives the image concatenation command from the host as well as the image data. In the image concatenation command, the VMF module 240 also receives all the placement commands necessary to append the image pieces which are to be concatenated. Print job parameters and DICOM parameters are included in the image concatenation command.

As noted above, when the first image of the concatenated images is sent to the printer 220, a new print object is created by the print controller 230 and stored in the print queue module 235. The new print object is utilized by the VMF module 240. The new print object includes all of the job settings specified in the image concatenation command, e.g., the 3IMGCAT4FLRAD command. The creation of a new print object causes the creation of a virtual canvas by the VMF module. Included in the concatenation command are VMF place settings, which the VMF module 240 utilizes to create the virtual canvas. The virtual canvas is an image window that is a size of the total image.

Under certain operating conditions, after all of the image sections to be concatenated are stored in the print queue module 235, the VMF module 240 places the first image section, minus the bottom border, into the virtual canvas, into an image frame area illustrated in FIG. 2 as "Create Frame" and "Insert Image." Under certain operating conditions, the VMF module 240 places the first image section after the first image section and command has been received. In an embodiment of the invention, the image frame has a size that is equal to the first image section minus a bottom border. By having the image frame with this size, the first image section is effectively cropped and blank data is removed. The VMF module 240 then places the second image section (minus 1-the top and bottom border if there are more than two image sections to be concatenated or 2- the top border only if there are two image sections to be concatenated) into associated image frames in the virtual canvas, as illustrated in FIG. 2. Under certain operating conditions, the second image section is placed below the first image section on the film. Under other operating conditions, the second image section is placed above the first image section. The VMF module 240 continues the placement of the image sections into associated image frames in the virtual canvas until the last image section is placed in the virtual canvas. In an embodiment of the invention, the image frame for any image section that is not the last image frame, is sized based on a size of the image section minus the size of the top border and the bottom border. In this embodiment of the invention, the image frame for the last image section is sized based on the size of the last image section minus the top border. In an embodiment of the invention, the VMF module 240 may crop the image sections to create cropped image sections before the placement into the image frames of the virtual canvas and the image frames may be a predetermined size.

Once the final image section is placed in the virtual canvas, the VMF module 240 issues a print (or completion) command, which results in the concatenated image being transmitted to the print output port 250. The concatenated image is then printed onto the long media by the printer 220. The placement of the image sections or image plates in a vertically adjacent manner, minus the cropped border areas caused by the appropriately sized image frames, results in the concatenated image. In other words, the placement of the cropped image sections results in the concatenated image.

Under certain operating conditions, when the DICOM header information and image sections are transferred to the printer 220 from the host 210, the printer 220 only utilizes job settings and DICOM parameters from the first image section and its associated DICOM header. Under these operating conditions, the job settings and DICOM parameters from the remaining image sections (and corresponding DICOM headers) are ignored.

If the job setting information or DICOM parameters do not specify the size of the media, e.g., film, then any image concatenation command of the form 2IMGCAT* results in a default media selection of 14×36 film. If the image concatenation command is of the form 3IMGCAT* or any number higher than 3, the default media selection will be 14×51 film. If fewer than 2 images are specified with the image concatenation command, an image will fail to print on the printer 220 and an error message is posted to an error log in the printer.

The print controller 230 also removes incomplete print jobs from the print queue. Errors may be made where too many image sections are sent to the printer 220, e.g., 3 images sections or image plates are transmitted with a 2IMGCAT* command. Errors may also be made where too few image pieces are sent to the printer 220, e.g., 2 image sections or image plates are transmitted with a 4IMGCAT* command. The print controller 230 waits a predetermined amount of time to receive the identified number of image sections or image plates. If the identified number of image sections or image plates are not received during the predetermined time, the print controller 230 removes the extra or left over image sections or image plates from the print queue. Thus, the image sections associated with the image concatenation command will be removed. For example, if 3 image sections are sent with the 2IMGCAT* command, the third image section may be removed if a fourth image section is not received within the predetermined timeframe, e.g., 3 minutes. Also, if only two image sections are sent with the 4IMGCAT* command, the two image sections are removed if the remaining two image sections are not transmitted within the predetermined timeframe. The print queue manager 235 places a time stamp each time an image section is placed into the print queue. The time stamp is utilized to determine if the time since the time of the last image section being placed into the print queue is greater than the predetermined timeframe. A print command being issued from the VMF module 240 erases the time stamp because the print command identifies that all image sections have been successfully received.

Image concatenation allows for any custom job settings associated with a host to be maintained except for a scale factor job setting or a crop anchor job setting. Any scale factor job setting is ignored because the image concatenation method replaces the scale factor mechanism. In addition, image concatenation only allows for three crop anchor settings to be utilized, i.e., Northwest, Northeast, and North (which is the default setting). Any other crop anchor job setting received is translated into one of the three allowable crop anchor settings. For example, if the crop anchor job setting is West or Southwest, then Northeast is applied. If the crop anchor job setting is East or Southeast, then Southeast is applied. If the crop anchor job setting is Center or South, then North is applied.

In image concatenation, a DICOM setting of decimate/crop/fail is ignored because the VMF module 240 always crops if the images to be printed are larger than the available virtual canvas.

The present image concatenation method and apparatus removes all extra border spaces in the stitched images, but does not remove any of the image data. Any concatenated image does not look like the image has been severed or reattached. The present image concatenation method and apparatus cuts off or eliminates white borders, black borders, or other color borders. In addition, the present image concatenation method and apparatus accommodates different original plate sizes, e.g., 10×12 inches, 14×17 inches, etc. These plate sizes may correspond to the image section sizes.

Figure 3:
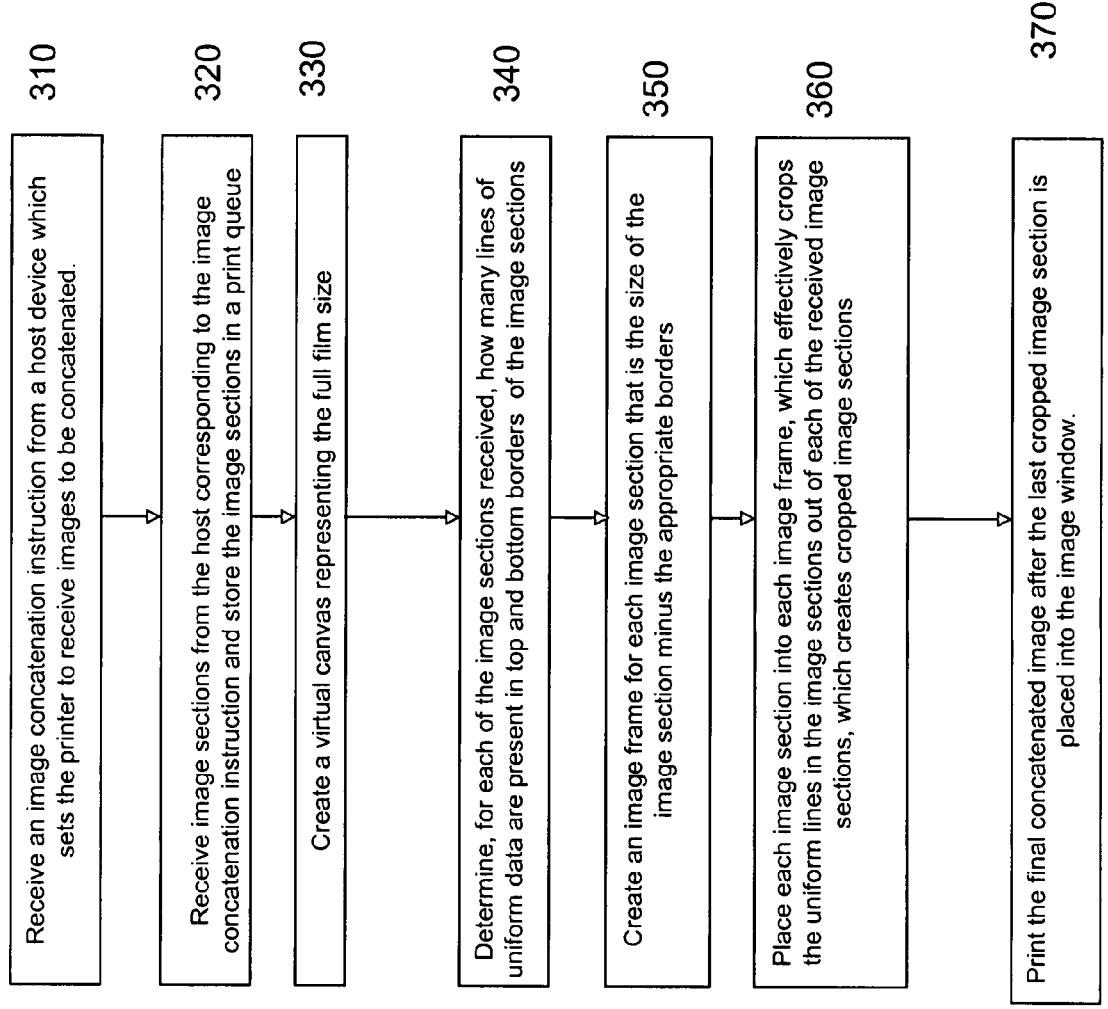
FIG. 3 illustrates a flowchart for assembling multiple image sections into a single film image according to an embodiment of the invention.

FIG. 3 illustrates a flowchart for assembling multiple image sections into a single film image according to an embodiment of the invention. In an embodiment of the invention, multiple DICOM images are assembled in a single film image. The printer receives 310 an image concatenation command (e.g., the AE Title image concatenation instruction) from a host device. The image concatenation instruction sets the printer to receive image sections to be concatenated. The printer receives 320 image sections from the host corresponding to the image concatenation command (e.g., the AE Title image concatenation instruction). The printer then stores the image sections in a print queue.

The printer creates 330 a virtual canvas representing a full film size (e.g., an 11" by 36" film size or an 11" by 51" film size). The printer determines 340, for each of the image sections received, how many lines of blank data are present on a top part and a bottom part of each image sections. The printer creates 350 an image frame for each image section that is the size of the image section minus borders, the borders being the lines of blank data for each of the image sections. As noted above, the first image frame may be a size of the first image section minus the bottom border. The second and additional image frames, if these image frames are not the last image frame, may be a size of the second or additional image sections minus a top border and a bottom border. The last image frame may be a size of the last image section minus the top border.

The printer places 360 places each image into each frame, which effectively crops the blank lines out of each of the received images, except for the blank lines at the top border of the first image and the bottom border of the last image. The printer prints 370 a final concatenated images after the last cropped image is placed into the virtual image window or canvas. Appendix A, attached hereto, identifies aspects of embodiments of the image concatenation software.

While the description above refers to particular embodiments of the present invention, it will be understood that many modifications may be made without departing from the spirit thereof The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A method of image concatenation, comprising:
   receiving an image concatenation command from a host device to instruct a printer to receive a plurality of image sections;
   receiving the plurality of image sections and corresponding image headers from the host associated with the image concatenation command and storing the plurality of image sections in a print queue;
   creating a virtual canvas and varying a size of the virtual canvas based at least in part on a quantity of image sections included in the plurality of image sections that are to be arranged to form a concatenated image, thereby establishing a full image size after receiving the image concatenation command;
   determining a quantity of lines of uniform data present outside of an image area of the plurality of image sections at a top section, at a bottom section, or at both a top section and a bottom section of the plurality of image sections to identify a dimension of a top border, a bottom border, or both a top border and a bottom border comprising the uniform data for each of the plurality of image sections;
   forming the concatenated image by arranging the plurality of image sections adjacent to each other along the virtual canvas to substantially eliminate the lines of uniform data between the plurality of image sections arranged on the virtual canvas and provide the concatenated image with an appearance of a single, essentially continuous image that spans the plurality of image sections arranged on the virtual canvas; and
   transmitting the concatenated image to be printed onto one sheet of a print medium.

2. The method of claim 1, further including cropping a bottom border of a first image section to create a cropped first image section and a top border of a last image section to create a cropped last image section.

3. The method of claim 1, further including creating a first image frame in the virtual canvas corresponding to the first image section minus the bottom border and a last image frame corresponding to the last image section minus the top border.

4. The method of claim 3, further including:
   placing the first image section into first image frame in the virtual canvas which effectively crops lines of uniform data from the first image section and eliminates the bottom border, and
   placing the last image section into the last image frame in the virtual canvas which effectively crops lines of uniform data from the last image section and eliminates the top border of the last image section.

5. The method of claim 4, further including printing a concatenated image on a single elongated film medium which represents the virtual canvas including the first image frame and the last image frame.

6. The method of claim 2, further including
   creating a first image frame in the virtual canvas corresponding to the first image section minus the bottom border, a second image frame in the virtual canvas corresponding to the second image section minus a top border and a bottom border, and a last image frame corresponding to the last image section minus the top border.

7. The method of claim 6, further including
   placing the first image section into the first image frame in the virtual canvas which effectively crops lines of uniform data from the first image section and eliminates the bottom border,
   placing the second image section into the second image frame in the virtual canvas which effectively crops lines of uniform data from the second image section and eliminates the top border and bottom border of the second image section; and
   placing the last image section into the last image frame in the virtual canvas which effectively crops lines of uniform data from the last image section and eliminates the top border of the last image section.

8. The method of claim 7, further including printing the concatenated image which represents the virtual canvas including at least the first image frame, the second image frame and the last image frame.

9. A program code storage device, comprising:
   a non-transitory computer-readable medium;
   computer-readable program code, stored on the non-transitory computer-readable medium, the computer-readable program code having instructions, which when executed cause a printer that is operatively connected to a host device to receive a plurality of image sections from the host device and print a concatenated image that comprises content combined from an image area of each of the plurality of image sections onto an elongated film medium to:
   receive a concatenation command from the host device to instruct the printer to receive the plurality of image sections;
   receive the plurality of image sections and corresponding image headers from the host corresponding to the image concatenation command and storing the plurality of image sections in a print queue;
   create a virtual canvas and vary a size of the virtual canvas based at least in part on a quantity of image sections included in the plurality of image sections to be arranged to form a concatenated image and establish a full image size after receiving the image concatenation command; and
   determine how many lines of uniform data are present at a top section, at a bottom section, or at both a top section and a bottom section of each the plurality of image sections which identifies a top border, a bottom border, or both a top border and a bottom border for each of the plurality of image sections.

10. The program code storage device of claim 9, including instructions which when executed cause the printer to crop a bottom border of a first image section to create a cropped first image section and a top border of a last image section to create a cropped last image section.

11. The program code storage device of claim 9, including instructions which when executed cause the printer to create a first image frame in the virtual canvas corresponding to the first image section minus the bottom border and a last image frame corresponding to the last image section minus the top border.

12. The program code storage device of claim 11, including instructions which when executed cause the printer to:
   place the first image section into first image frame in the virtual canvas which effectively crops lines of uniform data from the first image section and eliminates the bottom border, and
   place the last image section into the last image frame in the virtual canvas which effectively crops lines of uniform data from the last image section and eliminates the top border of the last image section.

13. The program code storage device of claim 12, including instructions which when executed cause the printer to print a concatenated image which represents the virtual canvas including the first image frame and the last image frame.

14. A method of image concatenation, comprising:
receiving an image concatenation command from a host device to instruct a printer to receive a plurality of image sections, wherein the image concatenation command is a single term that lacks spaces and includes information indicative of a quantity of the image sections that are to be received and concatenated into a concatenated image;
receiving the plurality of image sections and corresponding image headers from the host associated with the image concatenation command and storing the plurality of image sections in a print queue;
creating a virtual canvas representing a full image size based at least in part on the quantity of the image sections indicated by the image concatenation command after receiving the image concatenation command; and
determining how many lines of uniform data are present outside of an image area of the plurality of image sections at a top section, at a bottom section, or at both a top section and a bottom section of the plurality of image sections to identify a dimension of a top border, a bottom border, or both a top border and a bottom border comprising the uniform data for each of the plurality of image sections.

15. The method of claim 1, wherein the image area of each of the image sections comprises a different portion of an object to be printed, and the appearance of the concatenated image comprises the object, essentially in its entirety, collectively formed from the image areas of the plurality of image sections arranged on the virtual canvas.

\* \* \* \* \*